Aug. 19, 1947. J. GARTNER 2,426,090
COIL WINDING METHOD
Original Filed April 17, 1944
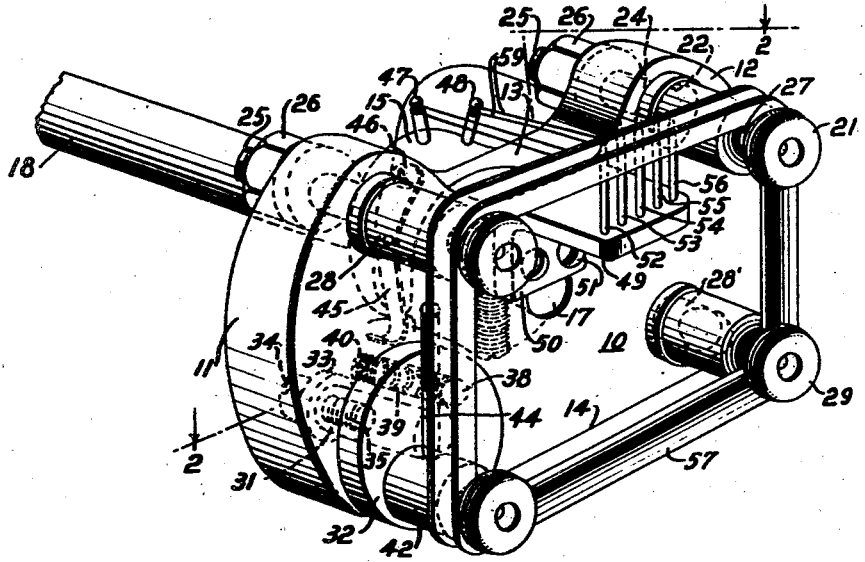
Fig. 1.
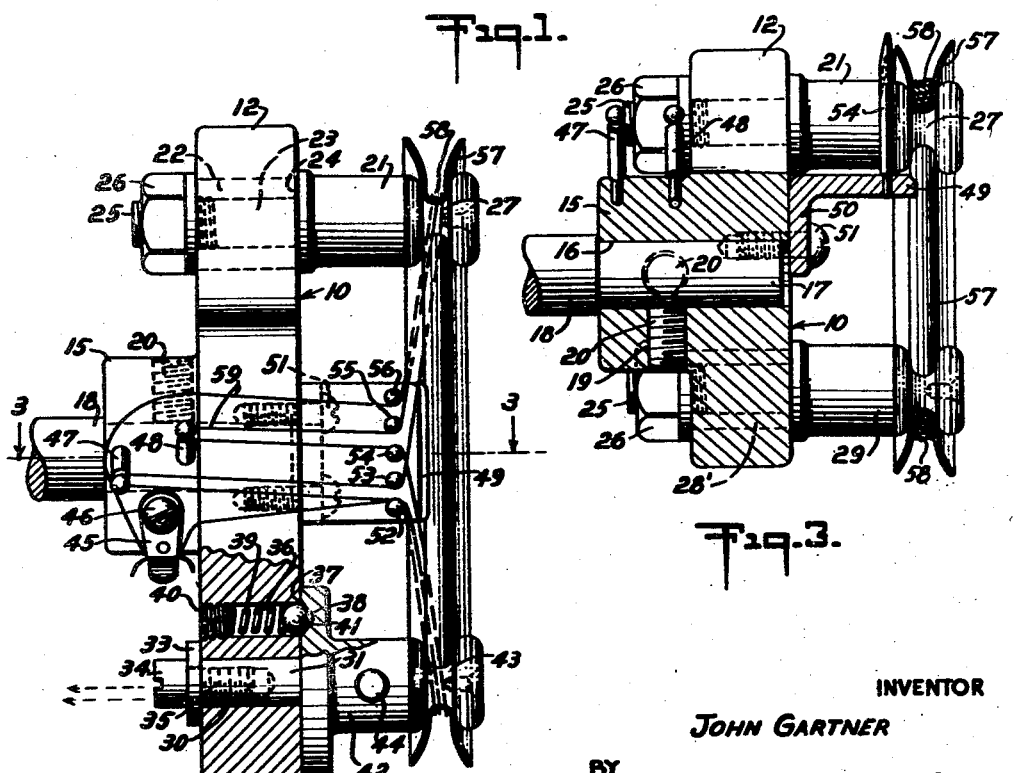
Fig. 2.
Fig. 3.
INVENTOR
JOHN GARTNER
BY
Charles M. Finkhouse
ATTORNEY Patented Aug. 19, 1947

2,426,090

UNITED STATES PATENT OFFICE 2,426,090

COIL WINDING METHOD

John Gartner, Hasbrouck Heights, N. J., assignor to Bendix Aviation Corporation, Teterboro, N. J., a corporation of Delaware Original application April 17, 1944, Serial No. 531,518, now Patent No. 2,399,631, dated May 7, 1946. Divided and this application May 31, 1945, Serial No. 596,838

3 Claims. (Cl. 242—10)

This invention is a division of my copending application Serial Number 531,518, filed April 17, 1944, now Patent No. 2,399,631, dated May 7, 1946, and relates to methods employed for the purpose of winding coils into a desired shape prior to assembling in the slots of an armature core.

The specifications of many electrical machines require the use of a very fine wire for the coil windings, such a wire is quite limp and has shape-sustaining properties to only a very small degree. Inasmuch as these coils must be formed into a predetermined shape, so as to fit the slots of the particular armature for which they are intended, it is highly important that the shape be maintained. It is also an absolute requirement that provision be made for connecting lead wires into the coil at proper points. Moreover, in nearly every instance, it is essential that each coil be provided with a suitable covering of insulation.

In order to satisfy these requirements there has been developed a wide spread practice of employing a sectional winding form which, when assembled, affords a groove that receives the several turns of the wire. While the form itself has the shape intended for the finished coil, it is necessary that the multiple turns of wire be tied together at suitable places, so that the coil will retain its shape after removal from the form.

An object of the present invention is the provision of a novel method of winding the coil in which there is provided an adhesive strip of insulating material which may be positioned about a series of posts in a condition in which the strip conforms to the shape of annular grooves in the posts. Thus, the strip acquires a channel shaped cross section which is readily adapted to receive the turns of the wire.

After the winding operation has been completed, the strip may be folded over the coiled wire, and due to its adhesive properties will remain in this encasing position.

A further object of the invention is the provision of a coil winding method, which includes a step that provides for the tying in of the lead wires at proper points.

Various other more detailed objects and advantages of the invention will in part become apparent, and in part be hereinafter stated as the description of the invention proceeds.

For a full and more complete understanding of the invention, reference may be had to the following description and accompanying drawings wherein:

Fig. 1 is a perspective view of a coil winding form such as may be used in carrying out the present method.

Fig. 2 is a top view partly in elevation and partly in section, this view being taken about on the planes represented by the line 2—2 of Fig. 1; and Fig. 3 is a view taken as a section about on the plane represented by the line 3—3 of Fig. 2.

Referring now to the drawing, wherein like reference characters denote corresponding parts, a coil winding form such as described and claimed in my copending application aforenoted, is shown as comprising a main body or supporting panel 10. This panel 10 may be made from any suitable material that is available and takes the form clearly illustrated in Fig. 1. This form is characterized by the curved side edges 11 and 12 which are joined at the top by a concave top edge surface 13 and at the bottom by a substantially straight edge 14.

Extending from the so-called inner face of the main body panel 10 is a hub portion 15 that is integral with the panel 10. An opening 16 extends though the hub portion 15 and panel 10. This opening 16 receives the reduced extremity 17 of a drive shaft 18 which may be driven from an appropriate source of power in a well known manner. The hub portion 15 is formed with a radial threaded opening 19, which receives a screw 20, which when tightened establishes the driving relation between the panel 10 and shaft 18.

The curved side 12 and concave top 13 define a corner which carries a fixed post 21. Post 21 is mounted on the panel 10 by a connection comprising an opening 22 that is formed in the panel 10. Extending through this opening 22 is a shank 23 that is of reduced diameter as compared to the post 21, thus providing an annular abutment shoulder 24 that engages the outer face of the panel 10. The free end of the shank 23 is threaded, as indicated at 25, and screwed thereonto is a nut 26. It is evident that the panel 10 is tightly clamped between the shoulder 24 and nut 26.

Adjacent to its outer or free end, the post 21 is formed with an annular channel or groove 27 that is substantially U-shaped in cross section, as illustrated.

Carried in the corner between the curved side 11 and concave top edge 13 is another post 28, which in all respects is similar to the post 21. This post is mounted on the panel 10 in the manner above described in connection with post 21. Another post 29 is mounted on the panel 10 adjacent to the corner defined by side 12 and straight bottom 14.

Approximate to the corner of the curved side 11 and bottom 14, the panel 10 is provided with an opening 30, which receives a stub shaft 31 formed on a plate 32. This plate 32 is rotatable on the axis of the shaft 31. The plate 32 engages the outer face of the panel 10, while a washer 33 is interposed between the head 34 of a screw 35 and the inner face of the panel.

In close proximity to the opening 30, the panel 10 is formed with another opening 36, which is partially closed on its outer face by lip 37. A ball detent 38 is positioned in the recess 36 and urged against the lip 37 by an expansion spring 39. A screw plug 40 closes the opening 36 on the inner face of the panel 10 and serves as a backing for the spring 39. The plate 32 is formed with a spherical recess 41, in which the ball detent 38 is adapted to fit to yieldably maintain the plate 32 in a desired position.

Extending outwardly from the plate 32 is a post 42, the axis of which is eccentric or offset with respect to the stub shaft 31. Adjacent to its outer or free end, the shaft 42 is formed with an annular channel 43 which corresponds to the channel 27 of the other posts. Extending radially outwardly from the post 42 is an operating member in the form of a handle 44, which may be availed of to rotate the plate 32 about its axis as occasion demands.

Carried by one side of the hub 15 is a leaf spring member 45 which may be secured thereto as by screw fastener shown at 46. This spring 45 serves as a guide for the wire which is fed to the form to be wound, as will be later pointed out.

The upper surface of the hub 15 carries a pair of anchoring pins 47 and 48 which are inclined with the angles of inclination diverging. Thus, the pin 47 is tilted in one direction and the pin 48 in the other.

Mounted on the outer face of the panel 10 is an L-shaped bracket 49 having a foot 50, which is secured to the panel 10 as by screws 51. The bracket 49 carries a plurality of pointed pins 52, 53, 54, 55 and 56. It will be noted that the central pin 54 is longer than the pins 53 and 55 on either side thereof and which in turn are longer than the end pins 52 and 56.

The lead wires which are to be tied into the coil that is wound about the post 21, is properly positioned by the anchoring pins 47 and 48 at one end, and by pointed pins 52 to 56, inclusive, at the other. This, in effect, provides for the tying in of four lead wires.

While a coil may be formed by simply leading the wire from which it is made in under the spring clip 45, and thence to the channels 27 and 43 of the posts 21, 28, 29 and 42, and rotating the panel 10 by driving the shaft 18, the invention has particularly in view inclusion of a preliminary step. This step involves the positioning of an insulation strip 57 about the post prior to the winding operation.

Insulation strips of this type are well known in this art and may comprise a suitable fabric backing that is treated on one face with an adhesive. The outer or non-adhesive surface of the strip 57 engages the posts, while the inner adhesive surface is adapted to receive the turns of the wire which are shown at 58. Thus, when the strip 57 is first positioned it assumes a channel formation as determined by the shape of the annular grooves 27 and 43.

After the panel 10 has been rotated a desired number of times to form the desired number of turns of the wire 58, the channel defined by the insulating strip 57 may be closed by bending over the free edges to complete the casing of insulation. The adhesive properties of the strip will cause this condition to be maintained.

The lead wires which are shown at 59 are turned over the pins 47, 48 and 50 to 54, inclusive, at the proper time to assume their proper position in the coil structure.

Upon initially placing the insulating strip on the winding form one end of the strip may be preferably placed so that a side portion thereof is impaled by the pointed pins 52, 53, 54, 55 and 56. The strip may then be wrapped for example about the several pegs 21, 29, 43 and 27 and returned to the aforenoted pins, where a side portion of the other end of the strip may be likewise impaled by the pointed pins 52, 53, 54, 55 and 56 so as to thereby retain the insulating strip in position. The pins 52, 53, 54, 55 and 56 thus stick through the insulating strip and thereby tend to hold the same in position.

In the winding of the coil, one end of the wire is first fastened at the leaf spring 45, as shown in Figure 2, and then laced about the pin 52. From the pin 52 the wire is then wound in the insulation strip 57 about the several pegs for the required number of turns. The wire is wound, as viewed in Figure 1, about the form as the form is rotated.

At the end of the desired number of turns, the wire is laced about the pin 53, as shown in Figure 2, and about the pin 47. From the pin 47 the wire is laced about the pin 52 and is then wound about the several pegs for a second desired number of turns.

At the end of the second desired number of turns the wire is laced about the pin 55 and looped around the pin 48. The wire is then laced about the pin 54 and wound about the pegs for a third desired number of turns.

At the end of the third desired number of turns the wire is laced about the pin 56 and the end fastened at the leaf spring 45.

Upon completion of the steps thus described the handle 44 may be actuated so as to vary the position of the peg 43 so as to permit the coil to be later removed from the pegs.

The insulating strip may then be removed from the impaling pins 52, 53, 54, 55 and 56 and the free edges turned over so as to complete the casing of insulation. As previously noted, the adhesive properties of the strip will cause this condition to be maintained.

In this latter operation the wires leading to the pins 47 and 48 and the leaf spring 45 will project from the insulation casing so as to provide convenient leads to the respective coils wound therein.

The completed coil encased in the insulation strip and with the desired leads projecting from the insulating casing may then be removed from the coil winding form.

While only form of the invention is hereinbefore set forth, it is to be clearly understood that the invention is not to be limited to the exact form illustrated and described, because various modifications of these details may be provided in putting the invention into practice within the purview of the appended claims.

What is claimed is:

1. A method of winding a coil, comprising the steps of placing an insulating strip of adhesive material about a plurality of spaced coil winding supporting members so as to assume a channel formation, positioning a wire in said channel, winding said wire in said channel about said insulating strip so that the completed coil and insulating strip assume a loop shape defined by said spaced supporting members, taking wire leads from said coil at different points, and turning the free edges of said insulating strip over so as to encase the completed coil in the adhesive insulating strip with the wire leads projecting therefrom.

2. A method of winding a coil, comprising the steps of placing an insulating strip of adhesive material about a coil winding support so as to assume a channel formation, positioning a wire in said channel, winding said wire in said channel about said insulating strip so that the wound coil and insulating strip assume a substantially rectangular shape, looping portions of said wire during the winding operation so as to project from said coil and insulating strip, and turning the free edges of said insulating strip over so as to encase the completed coil in the adhesive insulating strip with the wire leads projecting therefrom.

3. A method of winding a coil, comprising the steps of positioning a strip of adhesive insulating material about laterally spaced coil supporting members having annular grooves so that the strip conforms to the shape of the annular grooves and thereby acquires a substantially U shaped channel in cross section, winding a wire in the channel of said strip and about said supporting members, connecting a series of lead wires into said winding at several points, and folding the free edges of said adhesive strip over the completed coil so as to encase upon completion of the winding operation said coil therein with said lead wires projecting from said encasing strip.

JOHN GARTNER.

REFERENCES CITED

The following references are of record in the file of this patent:

UNITED STATES PATENTS

| Number | Name | Date |
|---|---|---|
| 1,485,289 | Peterson | Feb. 26, 1924 |